Figure 1:
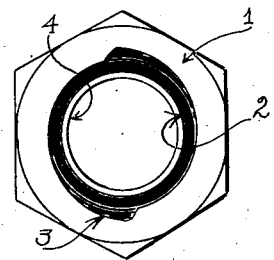

May 22, 1945. G. V. GLUMER 2,376,768
NON-LOOSENING SAFETY NUT
Filed July 7, 1944

Inventor
By Kimmel & Crowell
Attorneys

Patented May 22, 1945

2,376,768

UNITED STATES PATENT OFFICE 2,376,768

NONLOOSENING SAFETY NUT

Gustavo Vasquez Glumer, Mexico City, Mexico, assignor to Tuerca Victoria, S. A., Mexico City, Mexico, a corporation of Mexico Application July 7, 1944, Serial No. 543,911
In Mexico November 19, 1943

2 Claims. (Cl. 151—19)

This invention relates to a non-loosening safety nut of original design and construction to be used in place of combination nuts, lock nuts or check nuts, expansion nuts, plastic-expansion nuts, and similar designs.

The invention aims to provide, in a manner as hereinafter set forth, a nut of original construction and design which allows the securing of mobile or different parts, in such a way that, due to the special design and construction of the nut, said parts will keep their relative positions, assuring a permanent mechanical joint as a result of the progressive pressure of this original nut, which, once placed in its locking position, will not loosen itself unless the special combination of its composing parts is voluntarily released.

A further object of this invention is to provide, in a manner as hereinafter set forth, a nut of original design and construction which allows its use without any need of check nuts or lock nuts, expansion nuts, pins or keys, etc., which makes possible the incorporation in the nut itself of a lock system which, once set in its working position, will remain fixed notwithstanding vibration, reasonable wear, and possible changes in the position of the mechanical structure where the nut is being used. Such object is accomplished through the special and original combination of the composing parts of this non-loosening safety nut, which do not allow the same to change its relative position on the bolt unless voluntarily released.

A further object of this invention is to provide, in the manner as hereinafter set forth, a non-loosening safety nut of the above-mentioned characteristics which may be used on either standard or special bolts without altering their construction, as, such non-loosening characteristics are provided by the special design, construction, and combination of the composing parts of the nut. Thus, said nut may be used in all types of machinery and mechanical constructions in which such a device is needed as the simplicity of its design and function do not require complicated or additional tools, and its safety qualities will greatly reduce maintenance and repair costs.

With the foregoing and other objects, which may hereinafter appear, the invention consists of the novel design, construction, arrangement, and combination of parts as will be more specifically described and illustrated in the accompanying drawing wherein is shown an embodiment of the invention, but it is to be understood that changes, variations, and modifications may be resorted to which fall within the scope of the invention as claimed.

In the drawing:

Figure 1 is a top plan view of the safety nut, showing the groove where the safety washer operates.

Figure 5:
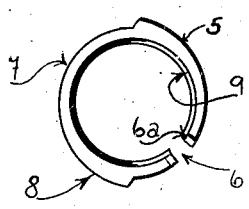
Figure 6:
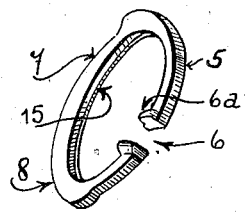
Figure 2:
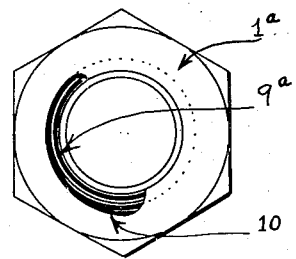
Figure 7:
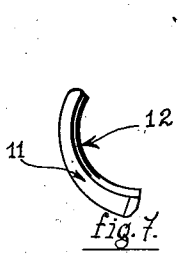
Figure 8:
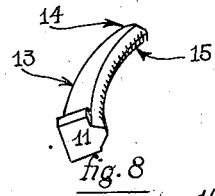
Figure 3:
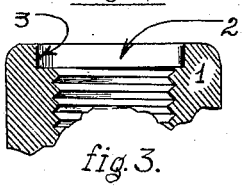
Figure 9:
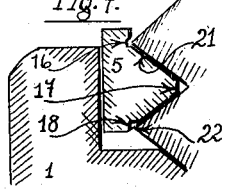
Figure 10:
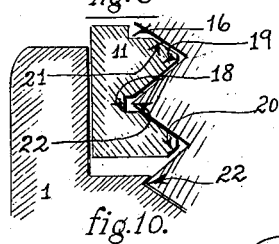
Figure 4:
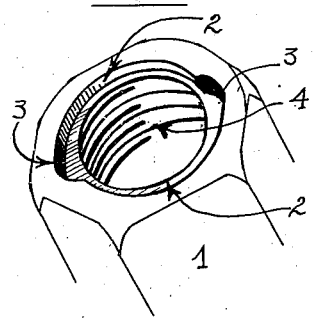
Figure 11:
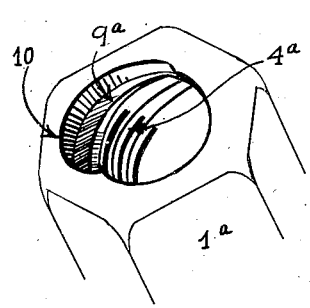

Figure 2 is a top plan view of a modification of the nut showing the groove in which the wedge or section of safety washer is placed, Figure 3 is a cross-section of the nut illustrated in Figure 1, Figure 4 is a perspective view of the nuts shown in Figures 1 and 2, illustrating the relative position of the circular and semi-circular grooves, Figure 5 is a top plan view of the safety washer, Figure 6 is a perspective view of the safety washer showing the excentric and tangential curves, Figure 7 is a top plan view of the wedge or section of safety washer, Figure 8 is a perspective view of said wedge or section of safety washer, showing the special construction of its screw thread, Figure 9 is a cross-section of the nut and safety washer or wedge, showing the relative positions of their respective screw threads, Figure 10 is a cross-section of the nut and safety washer or wedge, showing the relative positions of the respective screw threads, and, Figure 11 is a perspective view of the safety nut shown in Figure 2.

Figure 12:
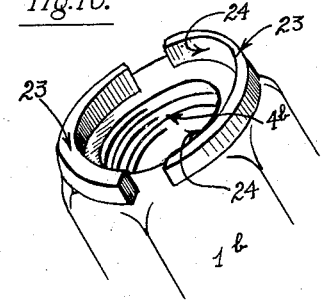

Figure 12 is a perspective view of the safety nut with a raised flange, or border.

The non-loosening safety nut consists of a main body 1 with lateral and exterior portions of quadrangular, hexagonal, or polygonal construction to allow the use of regular or common tools. This main body 1 is characterized by a circular groove 2 of original design and construction, provided with a concave wall with one or more curved and excentric surfaces 3 which have their vertexes in the screwing direction of the nut 1. Said excentric surfaces 3 correspond to the curved and excentric surfaces on safety washer 5 which will be placed in said groove 2 and which will operate in combination with this safety nut to make possible a perfect and permanent adjustment of the nut. Once said safety washer 5 is pushed in the direction of its vertexes and progressively tightened within said groove 2 until it is perfectly adjusted against the excentric wall of groove 2 and the thread of the corresponding bolt, the assembly is immobilized in its locking position.

The washer 5, of steel or similar and appropriate material, is split along its width to make possible any reduction in its diameter according to its different positions in relation to the excentric and tangential curved surfaces of groove 2 in nut 1. Washer 5 is provided on its convex wall 7 with one or more excentric, curved surfaces 8 of corresponding construction to the groove 2 in nut 1, in such a way that the vertexes of said excentric 8 lie in the direction of the vertexes of the excentric portions 3 of groove 2 in nut 1. The inside wall or concave portion 9 of the split washer 5 is provided with a section of screw threads 15 corresponding to the threads 4 in nut 1. This section of screw threads 15 has been especially designed to provide an effective friction and function efficiently, in such a manner that when split washer 5 changes from its neutral position within groove 2 of nut 1, to its working position, the coincidence of the excentric and tangential portions 3 of nut 1, and 8 of washer 5 force said split safety washer 5 to reduce its diameter, securing itself and the nut against the bolt, as a result of displacing excentric surfaces 8 of washer 5 on excentric surfaces 3 of groove 2 in nut 1, which, as stated, causes split washer 5 to reduce its diameter and to adjust itself conically on the screw threads of the bolt, firmly securing said nut 1 and eliminating any loosening vibration or movement of same. This washer 5 has a tendency, in its normal position, to rest against the walls of groove 2 of nut 1 in such a manner that said safety washer 5 rotates freely with the nut 1 without exerting any pressure against the screw threads of the bolt. When nut 1 has reached its locking position, and washer 5 is pushed in the direction of its vertex, said washer will be displaced into its working position; that is, the above-mentioned excentric surfaces 8 when in contact with the excentric surfaces 3 of groove 2 will force washer 5 to reduce its diameter, exerting a pressure on the screw threads of the bolt, which will increase with any tendency of the bolt to loosen itself. Upon displacing the safety washer 5 to its working position, its inside diameter reduces, locking the washer 5 on the screw threads of the bolt due to the special design of the crests or tops of its section of screw thread 15, which have been partially eliminated and indented and its roots which have been hollowed out so that any action tending to loosen the nut or the bolt, without first displacing the safety washer to its neutral position, will simply increase its pressure against the thread of the bolt, thus immobilizing the assembly.

With the same object, of providing a non-loosening safety nut which will remain voluntarily fixed and secured on its corresponding bolt, a section of the safety washer or wedge is used as shown in Figure 2. This wedge is used in connection with nut 1ª of conventional characteristics, and is provided with a semi-circular groove 9ª with an exterior and convex portion. Said portion has one or more curved surfaces 10, excentric and tangential in relation to the common axis of the bolt and the nut. These excentric surfaces have their vertexes in the screwing direction of nut 1ª. Said semi-circular groove 9 with its excentric surfaces 10 is used in connection with wedge or section of safety washer 11 which is characterized by its concave wall 12, provided with a section of screw thread 15 of the same radius as the corresponding bolt, and with indented and partially eliminated crests and hollowed out roots. This wedge 11 is also provided with a convex or exterior wall 13 which constitutes an excentric and tangential surface in relation to the common axis of the nut and bolt. This tangential surface has its vertex in the screwing direction of the nut, in such a way that when this wedge 11 is displaced inside the semi-circular groove 9 of nut 1ª, in the direction of its vertex, the excentric surface of its convex surface 13 will force said wedge against the screw threads of the bolt, exerting a perpendicular pressure against said thread. This pressure will increase with any tendency of nut 1ª to rotate in its un-screwing direction, thus, permanently securing said nut on its corresponding bolt, as a result of said perpendicular pressure of wedge 11 against the screw threads of the bolt, and against the walls of semi-circular grooves of nut 1ª. This function is a consequence of the relative displacement and coincidence of excentric surfaces 10 and 13.

The efficient function and adjustment of these extensions of the nut, split washer 5, section of washer or wedge 11 is assured by the special design of grooves 2 and 9 which have a greater depth than the thickness of split washer 5 or wedge 11, thus making possible a vertical displacement of said pieces which allows their screw thread sections 15 to engage the screw threads of the corresponding bolt. These screw thread sections 15 consist of a section of one or more threads and have a special construction and design to allow the efficient function of this wedge and split washer in combination with their respective excentric surfaces. To achieve this purpose, these screw thread sections 15 have their crests 17—19—20 indented and partially eliminated and their roots 16 and 18 hollowed out. That is, the displacement of this split washer and wedge against the screw threads of the bolt will be on the remaining surface of the sides 21 of said section of screw thread, avoiding any contact of crests and roots 22 of the corresponding bolt and crests 17, 19 and 20 and roots 16, 18 of the section of screw thread 15 of split washer 5 or wedge 11. This special design results in a conical adjustment of the corresponding sides of the screw threads on the bolt and pieces 5 and 11, leaving a free space between the reduced, indented, or hollowed crests and roots of pieces 5 and 11 and their corresponding crests and roots on the screw threads of the bolt.

This function of the composing parts of the non-loosening safety nut may also be obtained with the nut illustrated in Figure 12 which consists of a main body 1ᵇ of standard or conventional exterior design and with an inner screw thread 4ᵇ. This nut 1ᵇ is provided with a protruding border or flange 23 on its upper or lower portions. Said border or flange 23 may be an extension of the lateral, exterior portions of the nut or a partially protruding portion of its upper or lower surfaces. This border or flange 23 may be of circular or semi-circular design completely or partially covering the circumference of a circle concentric to the common axis of the nut, and the bolt. Flange or outer border 23 is provided with a concave wall 24 with the same characteristics as the corresponding wall of the groove in the nut previously described. Said inner wall 24 is provided with excentric, curved surfaces, tangential to a circle concentric to the common axis of the nut and bolt. These excentric surfaces of concave wall 24 coincide with the excentric and tangential portions on the convex wall of the safety washer 5 or wedge 11. This new assembly has the same function as the one already described, that is, the coincidence of the respective excentric surfaces on the safety washer 5 and the wedge 11 and those on the concave wall of the border or flange 23 forces said washer or wedge against the screw threads of the bolt by laterally displacing the wedge or decreasing the inside diameter of the washer.

What I claim is:

1. In a bolt and a nut threaded thereon, said nut having an eccentric recess in one end thereof extending from the threaded bore, a lock member loosely fitting in said recess and adapted upon unthreading force being applied to said nut to move circumferentially and inwardly into wedging position, said lock member having a pair of fragmentary threads engaging the thread of said bolt, the crests of the threads of said lock member being truncated to a degree greater than a normal thread, and the roots of the threads of said lock member including a recess extending from the angle formed by the side of said fragmentary threads whereby the crests of the bolt threads will always be free and the truncated crests of said lock member threads will always be spaced from the roots of said bolt threads.

2. In a bolt and a nut threaded thereon, said nut having a plurality of communicating eccentric recesses, an annular split lock member formed with cam-shaped projections in the periphery thereof loosely fitting in said recesses and adapted upon unthreading force being applied to said nut to move circumferentially and inwardly into wedging position, said lock member having a thread engaging the thread of said bolt, the crests of the thread of said lock member being truncated to a degree greater than a normal thread, and the valleys of the thread of said lock member including a recess extending from the angle formed by the sides of the thread of said lock member whereby the crests of the bolt threads will always be free and the truncated crests of said lock member thread will always be spaced from the valleys of said bolt threads.

G. VASQUEZ GLUMER.